Aug. 3, 1965  A. KACZERGINSKI  3,198,878
INSULATOR ASSEMBLIES OF COMPOSITE GLASS FIBERS AND RESIN
Filed Oct. 2, 1961  2 Sheets-Sheet 1
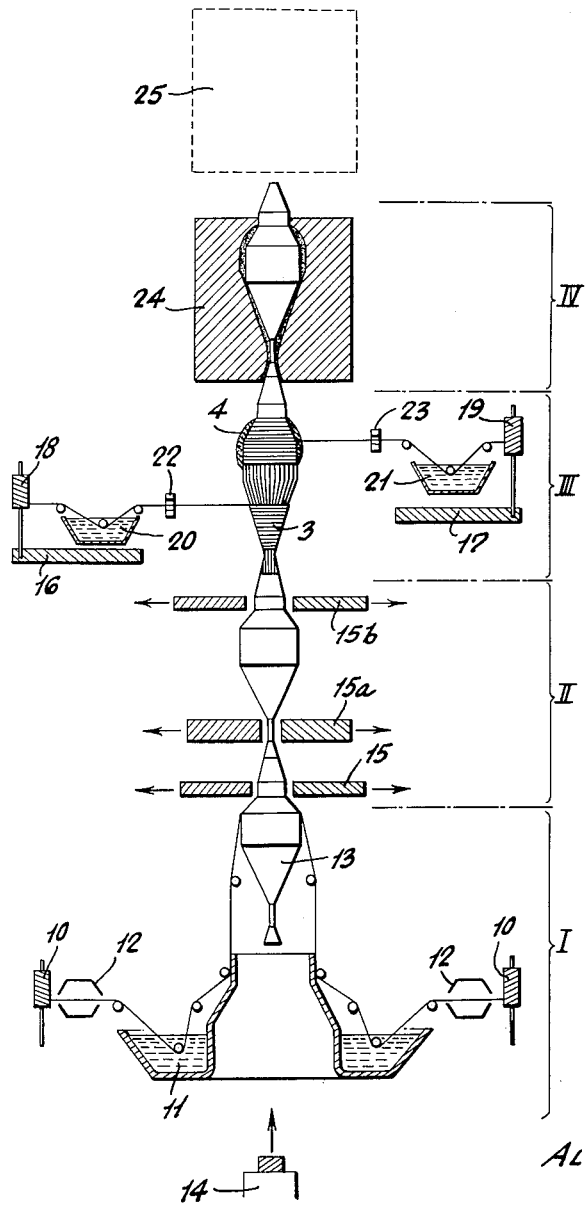
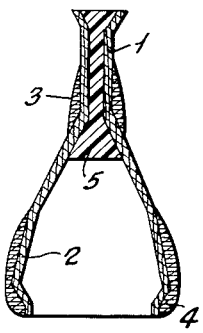
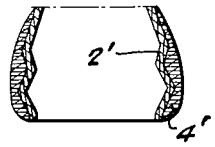
INVENTOR
ALEXANDRE KACZERGINSKI
BY Emmett F. Salter
ATTORNEY Aug. 3, 1965 A. KACZERGINSKI 3,198,878
INSULATOR ASSEMBLIES OF COMPOSITE GLASS FIBERS AND RESIN
Filed Oct. 2, 1961 2 Sheets-Sheet 2

INVENTOR
ALEXANDRE KACZERGINSKI
BY Emmett F. Salter
ATTORNEY

United States Patent Office 3,198,878
Patented Aug. 3, 1965

3,198,878
INSULATOR ASSEMBLIES OF COMPOSITE
GLASS FIBERS AND RESIN
Alexandre Kaczerginski, Vichy, Allier, France, assignor to
Societe Europeenne d'Isolateurs en Verre Sediver, Paris,
France, a corporation of France
Filed Oct. 2, 1961, Ser. No. 142,109
Claims priority, application France, Oct. 4, 1960,
840,253, Patent 1,276,072
9 Claims. (Cl. 174—176)

The present invention relates to insulator assemblies for electric power transmission lines, medium voltage distribution networks, or equipment of the type with hood and rods consisting of a certain number of insulating bodies or plates assembled together by connecting elements, each formed by a rod or shank sealed in the cavity of one of the insulating bodies and a hood sealed onto the core which is disposed on the top of the next lower insulating body.

According to one characteristic of the invention, the elements of the assembly, which may be separate or form a single piece, are composed of a synthetic resin with an exterior hoop or binding.

Besides the advantage stemming from the utilization of synthetic resin, particularly from the point of view of the electrical characteristics of the whole combination, the elements of the assembly according to the invention have high mechanical resistance.

According to another characteristic of the invention, the elements of the combination are constituted of continuous glass fibers or glass silk which are impregnated with organic resins and which may be placed advantageous along the generatrices or meridians located obviously in the planes passing through the axis of each element. The continuous glass fibers, constituting the interior stay or brace of the resin, assure resistance to stresses which are exerted parallel to the axis, while the hooping or binding assure resistance of the elements of the assembly to stresses which are exerted radially.

According to the invention, a hoop or binding has been provided advantageously at the junction zone of the extremity of the element forming the rod or spindle where it joins the hood, and another hoop surrounds the free end of the hood.

Arrangements for the manufacture of connecting elements of the assembly in a single piece, according to the invention, are described below, simply by way of illustration and not in a limiting sense.

In this description, reference is made to the attached drawings, wherein

FIG. 1 is a vertical sectional view of a connecting element of the combination according to the invention;

FIG. 2 is a partial vertical sectional view of a variant of the element shown in FIG. 1;

FIG. 4 is a schematic view illustrating a mode of production of the connecting elements of the combination according to the invention;

Figure 3:
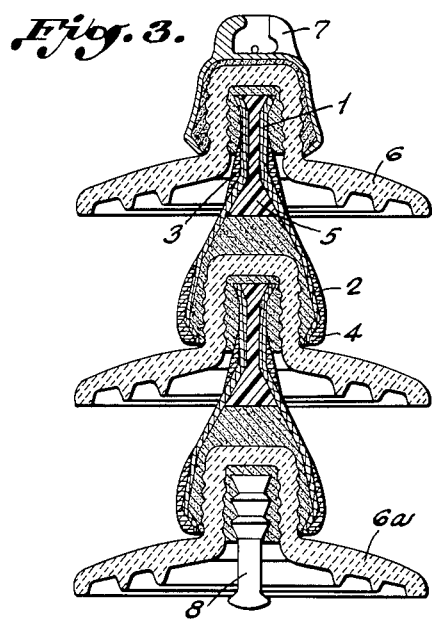
FIG. 3 is a vertical sectional view of a chain of insulators assembled according to the invention.

In the embodiment of the invention shown in FIG. 1, the connecting element according to the invention comprises a hollow rod or shank 1 of small cross-section and a hood or cover 2 of larger cross-section, constituted of continuous glass fibers embedded within or coated with synthetic resin. Synthetic resins capable of being use are, for example, polyester resins, epoxy or ethoxyline resins, silicone resins, as well as phenoplastic and aminoplastics, these examples being merely illustrative of other which may be used.

The glass fibers are advantageously placed along the meridians of the element. The latter comprises likewise a hoop or binding 3 wound around the junction zone of rod 1 with the part forming the hood, as well as a binding 4 wound around the base of the hood 2. These bindings or hoops are made of continuous glass fibers wound under tension and impregnated with organic resins which can be the same as those impregnating the fibers of the rod 1 and hood 2.

The part of the connecting element forming the rod or shank 1 being hollow, in the example given, it is necessary to close this cavity by means of a mass of filler 5 possessing sufficient mechanical resistance as well as good adherence to the material constituting the body of the element. This filler mass may be an organic resin with a charge of powdered mineral, for example, Araldites or polyester with fillers, or a stay or brace of mineral or organic fibers assuring anchorage of high resistance. Araldite is a trademark of Ciba, Limited, Basel, Switzerland. The product to which this trademark is applied, generally speaking, is the product of the reaction of a derivative of ethylene oxide with an anhydride of an organic acid. The derivative of ethylene oxide may be obtained by the reaction of a phenol in alkaline, alcohol or aqueous solution with epichlorohydrin.

FIG. 2 shows a variation of the configuration which the part forming the hood of the connecting element of the assembly may assume. The base of the hood 2' is formed with multiple ridges and grooves, which is surrounded by the binding 4'.

FIG. 3 shows a chain of insulators whose insulating bodies, discs or plates 6 are assembled by means of elements such as the one shown in FIG. 1. This chain of insulators comprises, at the upper extremity, a metallic cover or hood 7 designed to carry the required mechanical tractive stresses imposed on the assembly and, at its lower extremity, a rod 8 of high-resistance steel. This cover and rod, forming the extremities, are attached to insulating bodies 6, 6a as in suspended insulators of the known type, that is, by sealing or any other process. The insulating bodies, of tempered glass or electrical porcelain, are joined together by elements consisting of hoods and rods, such as that shown in FIG. 1, where rod 1 is placed in the sealing cavity of the upper insulating body, while the extremity 2, forming the hood, caps the head of the lower insulating body.

The sealing of the connecting elements of the assembly of hoods and rods to the insulating bodies, may be effected with the same material as that which constitutes said elements.

According to the first mode of production, the connecting elements of the combination are completely constructed without being put in place on the insulating bodies.

The installation shown schematically in FIG. 4 comprises coils 10 of glass fibers of the glass silk type with parallel strands preferably without torsion after finishing treatment. These coils are arranged around an impregnating tank or jar 11 containing the organic resin. Drying ovens 12 placed between the coils and the tank 11 serve to eliminate the moisture retained by the fibers before their impregnation. After passing into the resin tank, the fibers are suspended in air and dried so as to obtain the desired constant glass-resin ratio. The fibers forming a circular mat permit the passage of forming mandrels 13.

Mandrels 13 are constituted so as to be demountable or deformable in order to enable counter-stripping of the mats therefrom. They may be constituted of demountable or elastic elements. Their displacement and their setting in position are assured by a mobile support represented schematically on the drawing by element 14.

The first operating stage (I) of the process consists then in obtaining a sheaf of glass fibers in continuous and parallel elements impregnated with resin and forming a cylindrical mat.

The second operation (II) consists in moving the mandrel, about which the mat of fibers has been placed, to the pre-forming station constituted by diaphragms 15, 15a, 15b, which impose on the mat of fibers the conformation of the profile of the mandrel.

In the third operation (III), the mandrel is brought to the binding or hooping station. The latter comprises tables 16 and 17 on which are placed the spools 18, 19 of glass fibers of the glass silk type; impregnating tanks 20, 21; and vertically movable guiding devices 22, 23, respectively. The tables 16 and 17 rotate about the axis of the mandrel, and by winding the fibers under tension, bindings 3 and 4 are produced in the course of this movement by the vertical displacement of guides 22, 23.

For the fourth operation (IV), the mandrel is brought to the molding or casting station. A mold 24 is placed around the rough shape of the pre-formed and bound hood and rod element. Then the mold is supplied with resin, with or without a filler, by pouring, injection or suction. The mold is next brought to oven 25 where heat assures the hardening through polymerization of the bound hood and rod element. At this last stage, the extremities of the hood and rod are cut and the completed unit is brought back to the molding and hardening stations. A plurality of casting molds makes possible a functional rotation thereof in timed relation to the completion of the hood and rod units and to their hardening and extraction.

When the mandrel is demounted or deformed, a bound or hooped hood and rod connecting element is obtained, ready for use.

This process permits the continuous industrial production of connecting elements according to the invention which have variable sections and reinforcement fibers oriented along the lines of the stresses which are to be encountered. It should also be pointed out that the reinforcement fibers on the one hand, and the binding fibers on the other, have a uniform tension up to the stage of hardening, which permits obtaining, in a unitary piece having a variable section and which is subjected to compound stresses, i.e. traction, compression and flexion, of rupture values under loads which may be of the order of 50 kg. per square millimeter.

According to a variation of the process, rough or preliminary shapes or outlines of the hood and rod connecting elements are put in place on the insulating bodies, these elements then being polymerized and then hardened.

In this process, a rough shape is obtained in the manner outlined above, but without hooping or binding the extremity forming the cover, and without having proceeded to the molding operation. The retention of such a preliminary shape as shown in FIG. 5, and which comprises the single binding 3 of the hollow shank, is assured by a pre-gelation or pre-polymerization of the resin by utilizing, for example, solvent-phase resins in the case of Araldites, or by selecting catalyzers and accelerators which permit obtaining a pre-gelation in the case of polyester resins.

Figure 6:
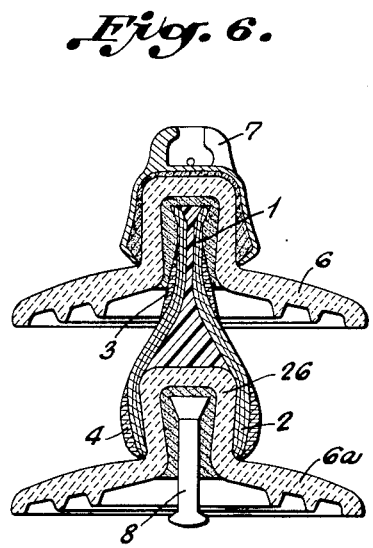
FIG. 6 is a vertical sectional view of an insulator assembly produced by a variant of the process.
Figure 5:
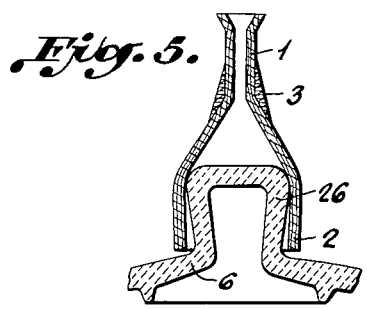
FIG. 5 is a vertical sectional view of an element of the assembly, in preliminary outline.

This preliminary shape is put in place with its hood 2 being fitted on head 26 of the insulating body 6 (FIG. 5). Then the hood is bound or hooped under tension, and the longitudinal fibers of the element enter into embracing relation with the profile of head 26 of the insulating body. After the hooping or binding, the operation of molding and polymerization is carried out as above. After complete hardening, the rod or shank of the element is sealed to the next upper insulating body. Thus, an insulating assembly, such as is shown in FIG. 6, is obtained.

Figure 7:
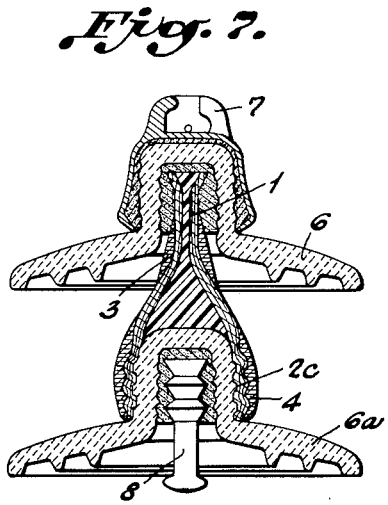
FIG. 7 is a vertical sectional view of another variation of the insulator assembly.

It is advantageous, as shown particularly in FIG. 7, to provide circumferential channels, grooves, threads 2c, or the like, on the heads of the insulating bodies or plates, to secure a better anchoring of the hood of the connecting element thereto.

Figure 8:
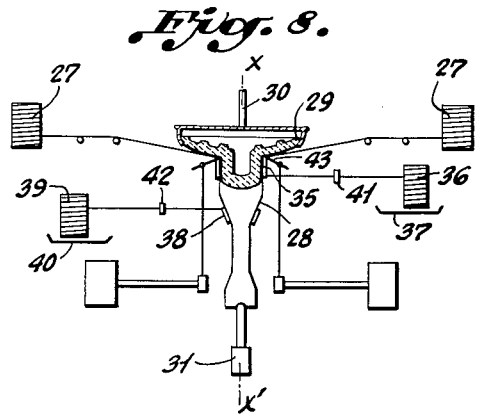
FIG. 8 is another schematic view illustrating another mode of producing elements of the combination according to the invention.

The invention provides also for obtaining the hood and shank connecting elements by first making a dry pre-formed member, preferably mounted on an insulating body, this pre-formed member then being placed in a mold into which resin is conducted, so as to obtain the final hood and shank assembly after molding, polymerization and hardening. FIG. 8 illustrates schematically, one mode of executing this operation.

A support 30 and a counter-point or counter-support 31 are disposed along an axis XX'. These two parts may be displaced along this axis independently of one another. An insulating plate 29 is fastened to support 30. The shape of the head of this plate is tapered so as to permit an in-setting or wedging of the hood against the head, as illustrated with respect to tapered head 26 in FIG. 5, or the ridged head 2c in FIG. 7. This insulating plate can possibly be replaced by a mandrel in the case where, for any reason whatsoever, it is desired to obtain hoods or covers independent of the insulating plates. This mandrel may be made of elastic materials or several rigid pieces which are arranged to permit the extraction of the mandrel, since its shape before anchoring would oppose a direct removal from the mold.

Coils 27 are disposed uniformly around the mounting which has just been described. The fibers of these coils pass into guide rings concentric with axis XX' which permit a cylindrical sheaf 28 of fibers to be obtained around the head of the insulating piece. This cylindrical sheaf is fastened at one end thereof to support 31, and at the other end thereof onto the insulating piece 29 for example, by a short hoop, by clamps, by elastic, or by a wedge.

After putting the sheaf of fibers coming from coils 27 in place around the head of the insulating body and the counter-point or support 31, a first binding 35 is produced by winding under tension the continuous glass silk fibers supplied from a bobbin 36 placed on a turn-table 37. Also, a second binding 38 is produced by winding under tension fibers of the same type fed from a bobbin 39 placed on a turn-table 40. Vertically movable guides 41 and 42, respectively, build up the hoops or bindings 35 and 38 to the desired height and thickness.

Other parts of the piece may be hooped, if desired, by means of the same devices as described above, or by other similar devices, in order to impart a predetermined rigidity to the assembly.

The pre-formed connecting element thus obtained is then cut from the sheaf of fibers by rotary circular knives 43, which, after cutting, are retracted in order to permit the passage of the pre-formed element.

The pre-formed element is then placed in a drying oven to effect complete dehydration of the fibers composing the body. After drying, the pre-formed element is placed in a mold, the shape of which is such that a practically constant glass-resin proportion is obtained in the entire cross-section of the hood and shank element. This pre-formed piece is impregnated with a flowing resin and is polymerized in its mold by known processes employing vacuum to eliminate occlusions of air harmful to good electrical behavior of the pieces. This process results in a simplification of manufacture, a reduction in net cost and a precise and constant proportion of glass and resin. It also permits obtaining hoods and shanks integral with the insulating plates without sealing.

I claim:

1. A connecting element for insulator assemblies of electric power transmission lines, comprising a body of synthetic resin with a rod-shaped shank portion and an integral hood portion depending from said shank portion and diverging therefrom, said body being reenforced with glass fibers extending only longitudinally thereof and integrally through said shank and hood portions, and an external circumferential reenforcing hoop on said body along a portion of the length thereof.

2. A connecting element for insulator assemblies of electric power transmission lines, comprising a body of synthetic resin with a rod-shaped shank portion and an integral hood portion depending from said shank portion and diverging therefrom, said body being reenforced with continuous glass fibers extending only longitudinally thereof and integrally through said shank and hood portions, and an external circumferential reenforcing binding on said body along a portion of the length thereof and composed of glass fibers coated with resin wound around said body in planes transverse to those of the first-mentioned glass fibers.

3. A connecting element for insulator assemblies comprising a hollow shank portion in the form of a surface of revolution and an integral hood portion of larger diameter than said shank portion depending from said shank portion and diverging therefrom, said element being formed of a body of glass fibers embedded in an organic resin with the fibers disposed only along the generatrices of said surface of revolution and integrally through said shank and hood portions, and a circumferential binding of glass fibers coated with organic resin wound around the exterior of said element in planes transverse to the longitudinal axis of said element.

4. A device as set forth in claim 2 wherein the binding is disposed in the junction zone of the shank and hood portions of the connecting element whereat the hood portion depends from the shank portion.

5. A connecting element for insulator assemblies comprising a hollow shank portion in the form of a surface of revolution and an integral hood portion of larger diameter than said shank portion depending from said shank portion and diverging therefrom, said element being formed of a body of glass fibers embedded in an organic resin with the fibers disposed along the generatrices of said surface of revolution, and a circumferential binding of glass fibers coated with an organic resin wound around the exterior of said element in planes transverse to the longitudinal axis of said element, said binding being disposed in the junction zone of the shank and hood portions of the connecting element whereat the hood portion depends from the shank portion, as well as adjacent to the free end of the hood portion whereat the same is of maximum diameter.

6. A device as set forth in claim 3 wherein the hollow shank portion is filled with a plastic binding mass in tight adherence to the inner surface of said element.

7. A connecting element for insulator assemblies comprising a hollow shank portion in the form of a surface of revolution and an integral hood portion of larger diameter than said shank portion depending from said shank portion and diverging therefrom, said element being formed of a body of glass fibers embedded in an organic resin with the fibers disposed along the generatrices of said surface of revolution, and a circumferential binding of glass fibers coated with an organic resin wound around the exterior of said element in planes transverse to the longitudinal axis of said element, the interior surface of said hood portion being formed with a plurality of alternate ridges and grooves to increase the surface area thereof.

8. An insulator assembly comprising a connecting element having a hollow shank portion in the form of a surface of revolution and an integral hood portion of larger diameter than said shank portion depending from said shank portion and diverging therefrom, said element being formed of a body of glass fibers embedded in an organic resin with the fibers disposed along the elements of said surface of revolution, a binding of glass fibers coated with an organic resin wound around the exterior of said element in planes transverse to the longitudinal axis of said element and disposed in the junction zone of the shank and hood portions of the connecting element whereat the hood portion depends from said shank portion, an insulator disc of electrically insulating material connected to said element and provided with a head projecting from the top of said disc, and the lower end of said hood portion being enlarged and embracing said head of said insulator disc and pressed therearound with a circumferential binding of glass fibers impregnated with a synthetic resin.

9. An insulator assembly as defined in claim 8 wherein the head of the insulator disc is provided with circumferential ridges to effect a tighter interengagement with the internal surface of the hood portion.

References Cited by the Examiner

UNITED STATES PATENTS

| | | | |
|---|---|---|---|
| 949,184 | 2/10 | Kelman | 174—138 |
| 1,242,907 | 10/17 | Austin | 174—182 |
| 2,008,414 | 7/35 | Fischer | 174—182 |
| 2,877,498 | 3/59 | Schneider | 18—47.5 |
| 2,921,343 | 1/60 | Mumford | 18—47.5 |
| 2,977,406 | 3/61 | Scott | 174—177 |
| 2,997,529 | 8/61 | Fink | 174—179 X |

LARAMIE E. ASKIN, *Primary Examiner.*

JOHN P. WILDMAN, *Examiner.*